UNITED STATES PATENT OFFICE.

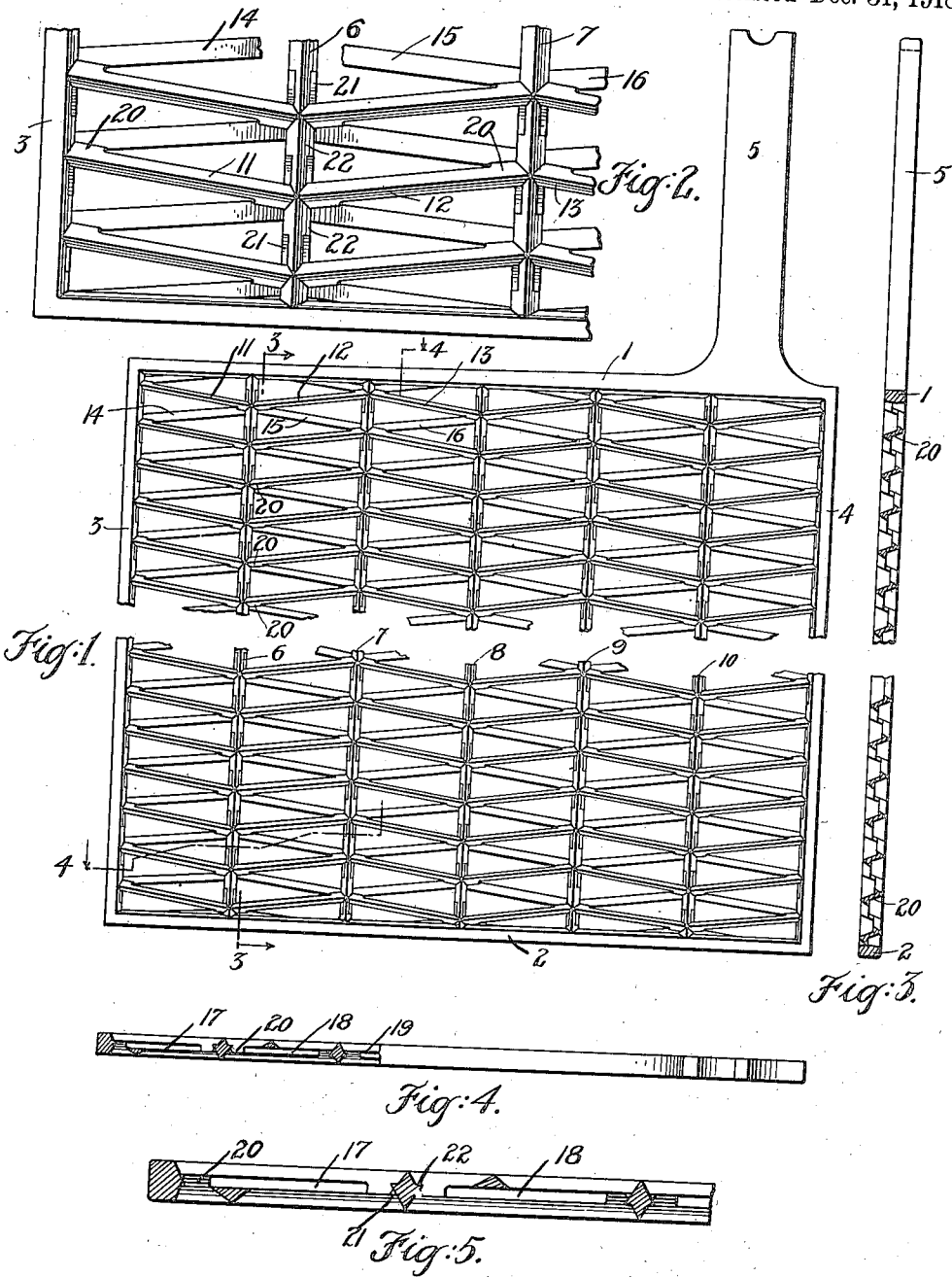

EDWARD F. ANDREAE, OF NEWARK, NEW JERSEY, ASSIGNOR TO GENERAL LEAD BATTERIES COMPANY, A CORPORATION OF DELAWARE.

STORAGE-BATTERY GRID.

1,289,354.

Specification of Letters Patent. Patented Dec. 31, 1918.

Application filed June 29, 1916. Serial No. 106,576.

*To all whom it may concern:*

Be it known that I, EDWARD F. ANDREAE, a citizen of the United States, residing at Newark, county of Essex, and State of New Jersey, have invented new and useful Improvements in Storage-Battery Grids, of which the following is a specification.

This invention relates to means for holding the active material in a storage battery plate of the pasted or Faure type.

More particularly it relates to what is known as a double latticed grid. Grids of this type comprise two lattices or gratings separated by a space, the active material being pasted in this space and into the apertures of the gratings.

In grids of the double lattice type, the structure is stiffened and strengthened by having the grating bars inclined. Such grids, however, have not been capable of formation in a simple mold, but require the use of a special form of core to produce the space between the gratings such as a baked sand core, which is destroyed with every grid formed, or what is known in the art as a draw-bar. The draw-bar is a tongue or plate inserted in the mold to fill the space which is to exist between the gratings and which is withdrawn after the grid has been cast. In order that it may be withdrawn from the interior of the grid, it is necessary that the grid be cast with one of its sides split in two parts so that the draw-bar can be withdrawn between them. This leaves an open slot which opens into the interior space. In order that the active material may be prevented from falling out through this slot, it is necessary to close it up in some manner. This may be done in various ways by pressing the sides of the slot together, burning them together or in other ways. The burning is an expensive and tedious process while the pressing together of the slot edges provides an unreliable closure. The pressing together forms but an imperfect closure as it is practically impossible to force the parts tightly together at all points, the bending of the parts incident to the pressing of the slot together is liable to break them and, in the use of the plate in the battery the active material and grid are subjected to stresses liable to open the slot to a greater or lesser extent while the weight of the active material has the same tendency especially when the slot is at the bottom of the grid.

The main object of the present invention is to provide a strong and stiff grid of the double latticed type which shall not require use of destructible cores, draw-bars, etc., but which may be made in a two-part mold; this does away with the necessity for providing a slot at the side of the grid as above referred to so that the edges of the grid may be made of solid bars, acting as a secure closure for the interior space of the grid; the use of the solid bars avoiding the necessity of bending any of the parts to secure the closure and consequently avoiding the breakage incident thereto as above referred to.

A further object of the invention is to provide webs between opposite bars of the lattices whereby the plate is stiffened and strengthened transversely.

A further object of the invention is to provide special securing means for the active material, such means bearing located upon the devices for spacing the gratings.

Other and ancillary objects of the invention will appear hereinafter.

In the accompanying drawings which illustrate the invention,

Figure 1, is a side elevation partly broken away of a grid embodying the invention.

Fig. 2 is a view similar to the view in Fig. 1 of a fragment of a grid on an enlarged scale.

Fig. 3 is a section on the line 3—3 of Fig. 1, looking in the direction of the arrows.

Fig. 4 is a section on the line 4—4 of Fig. 1, looking in the direction of the arrows, and Fig. 5 is a portion of the view of Fig. 4, the remainder being broken away, on an enlarged scale.

Referring to the drawings, the grid comprises a peripheral frame composed of the solid bars 1, 2, 3 and 4, 1 and 2 being the top and bottom respectively and 3 and 4 being the sides. From the top bar extends the terminal 5 by which connection is made to the plate. Extending from the top bar 1 to the bottom bar 2 are ribs or partitions 6, 7, 8, 9 and 10. These ribs are of a cross-section as shown clearly in Figs. 4 and 5, being double triangular in shape, the apices of the triangles being at the faces of the grid. Between the partitions or ribs and the frame of the grid extend the bars forming the lattices or gratings. One of the lattices is formed by a plurality of series of bars as 11, 12, 13, etc., extending from one side of the grid to the other, these bars being arranged substantially end to end, and alternate bars being oppositely inclined. The remainder of the lattice is formed of a plurality of similar series suitably spaced. The other lattice is similarly formed of a plurality of series of bars, each series consisting of bars as 14, 15, 16, etc., arranged substantially end to end, extending from one side of the grid to the other and having alternate bars oppositely inclined. The two lattices are spaced apart having the spaces as 17, 18, 19, etc., for the active material between them and the partitions or ribs 6, 7, 8, etc.

Between the bars of the opposite lattices are formed webs as 20, which extend from the junction of the bars with the ribs or margin bars for a portion of the length of the lattice. This greatly stiffens the plate against transverse bending and also, shortens, and in effect, stiffens the individual lattice bar between the ribs so that a smaller cross-section of bar may be used for a given distance between partitions or, vice versa, for a given distance of partitions and cross-section of bar the bar is greatly stiffened. This enables a smaller sized lattice bar to be used which is of great importance in this art where the very slightest increase of weight is to be guarded against. It will be observed that the lattice bars of one lattice do not overlie the bars of the other lattice, that is to say the projection of the lattice bars of one lattice into the plane of the other lattice would not intersect the bars of the latter except at those points where it is desired to form the webs 20 where there is an overlapping to the extent to which it is desired that a web shall be formed. If no connection is desired there will be no overlap.

Upon the sides of the ribs or partitions between the bars of a lattice are formed the oppositely faced shoulders or shelves 21, or 22, each extending a portion of the distance between the adjacent latticed bars which interlock with the active material and materially aid in securing the same.

The grid as described comprising the frame, terminal, lattices and partitions may be cast integral, and such structures are usually formed from antimonious lead.

While the invention has been illustrated in what are considered its best applications it may have other embodiments without departing from its spirit and is not therefore limited to the structures shown in the drawings.

What I claim is:—

1. A double-lattice grid having separated lattices of reversely inclined bars, the two lattices being spaced apart and having no overlying parts except at points where a connection between them is made.

2. A double-lattice grid having separated lattices of inclined bars, the bars of one lattice being opposite apertures of the other lattice and having no overlying parts except at points where a connection between them is formed.

3. The combination with a peripheral frame, of ribs or partitions extending between opposite sides of the frame, lattices supported in separated relation by said frame and partitions, and shoulders upon said partitions adapted to interlock with the active material.

4. The combination with a peripheral frame, of ribs or partitions extending between opposite sides of the frame, lattices supported in separated relation by said frame and partitions, and shoulders upon said partitions adapted to interlock with the active material, said shoulders being located on said partitions between their junctions with the lattice bars and non-coincident with the central plane midway between the lattices and parallel thereto.

5. The combination with a peripheral frame, of ribs or partitions extending between opposite sides of the frame, lattices supported in separated relation by said frame and partitions, and oppositely faced shoulders upon said partitions adapted to interlock with the active material.

6. The combination with a frame, of partitions or ribs extending between opposite sides thereof, lattice bars extending between said frame and partitions and between said partitions, and spaced apart thereby to separate the lattices, and webs between the ends of adjacent bars of the two lattices, said webs being adjacent said frame and partitions and extending along a portion of the length of the lattice bars.

7. A double latticed grid having a frame, partitions or bars extending from one side of said frame to the other, lattices separated by said frame and partitions, each of said lattices comprising a plurality of series of bars, each of said series extending transversely of said partitions and composed of inclined bars arranged substantially end to end, alternate bars being inclined in opposite directions, the series of one lattice being opposite the openings between the series of the other lattice, the apices of the series in the two lattices being at substantially opposite points of the said ribs, and webs extending between the bars of the opposite lattices adjacent to the junctions of said lattice bars with the ribs and frame.

8. In a storage battery grid, the combination with a peripheral frame, of ribs or partitions extending between opposite sides of the frame and lattices supported in separated relation by said frame and partitions, said partitions being of a double triangular cross section, the triangles being similar and having their apices substantially in the planes of the faces of the grid, and the bases of said triangles being non-coincident with the center line between the two apices whereby a shoulder is formed on the partition.

9. In a storage battery grid, the combination with a peripheral frame, of ribs or partitions extending between opposite sides of the frame and lattices supported in separated relation by said frame and partitions, said partitions being of a double triangular cross section, the triangles being similar and having their apices substantially in the planes of the faces of the grid, and the bases of said triangles being non-coincident with the center line between the two apices, the said triangle bases being, at one section of a partition, on one side of said center line and at another section of the partition, on the other side of the center line whereby oppositely faced shoulders are formed upon the partition.

In testimony whereof, I have signed my name to this specification this 26th day of June, 1916.

EDWARD F. ANDREAE.